United States Patent Office 3,395,189
Patented July 30, 1968

3,395,189
PURIFICATION OF 1,2-BIS(3-CYCLOHEXEN-
1-YL)ETHYLENE (BCE)
Donald H. Kubicek and Donald L. Crain, Bartlesville,
Okla., assignors to Phillips Petroleum Company, a corporation of Delaware
No Drawing. Filed Nov. 4, 1966, Ser. No. 591,966
5 Claims. (Cl. 260—666)

This invention relates to a process for the purification of 1,2-bis(3-cyclohexen-1-yl)ethylene, hereinafter designated BCE.

It has recently been found that the compound BCE can be prepared by contacting 4-vinylcyclohexene with a catalyst containing molybdenum and/or tungsten oxides or compounds convertible to the oxides deposited on or admixed with a support comprising silica and/or alumina. The catalytic reaction is conducted at a temperature in the range of 25 to 300° C., preferably 75 to 200° C., using a time in the range of about 0.5 second to 24 hours or longer at a pressure in the range of atmospheric to 1500 p.s.i.g. Further details of the disproportionation process are disclosed in the application of Donald L. Crain, Ser. No. 502,544, filed Oct. 22, 1965, now abandoned. In this process, the selectivity to the desired product is high, about 85 percent, but it is desirable to isolate this compound in a higher purity. However, because the principal by-products of this reaction are essentially isomeric and have similar boiling points, separation and purification by conventional fractional distillation has proven to be very tedious, requiring an unusually efficient distillation column and vacuum equipment. These by-products are generally double bond isomers with some skeletal isomers.

This invention is concerned with a simpler and more effective method for purifying crude BCE than by fractional distillation.

Accordingly, it is an object of the invention to provide an effective process for purification of crude BCE (mixtures of BCE with closely boiling isomers). Another object is to provide a process for purification of crude BCE, particularly the reaction product obtained by disproportionation of 4-vinylcyclohexene, by crystallization. Other objects of the invention will become apparent to one skilled in the art upon consideration of the accompanying disclosure.

A broad aspect of the invention comprises mixing crude BCE with an aliphatic paraffin hydrocarbon solvent containing up to 8 carbon atoms per molecule in proportions which permit crystallization of a substantial proportion of the BCE when the resulting mixture is chilled to a low temperature and thereafter chilling the resulting mixture or solution to a sufficiently low temperature to effect crystallization, and recovering the resulting crystals which have a higher concentration of BCE therein than the concentration of this compound in the crude BCE. Paraffins, such as propane, butanes, pentanes, hexanes, heptanes, and mixtures thereof, are effective in the crystallization process. Normal pentane is the preferred diluent. These paraffins are capable of forming a liquid solution with the crude BCE in at least part of the range of about $-70$ to about $-110°$ F. when used in the crystallization process.

The lower paraffins are specifically suited for the purification process as applied to crude BCE, but not all solvents for this product are operable. For example, such well known solvents as methanol, ethanol, isopropanol, and acetone were found to be unsuitable in this purification process.

The amount of solvent to be dissolved in the crude BCE is in the range of about 0.5 to about 5 volumes of solvent or diluent per volume of crude BCE. The resulting solution is then chilled to a crystal-forming temperature in the range of about $-70$ to $110°$ F. at any convenient rate and at any convenient pressure which is adequate to maintain the mixture in substantially liquid phase until crystals form. When the solution has been sufficiently chilled to produce a slurry of crystals containing solids in the range of about 5 to 40 percent by volume of the slurry, the solids are separated by conventional means, such as by filtering or centrifuging. The solid phase contains crystals which are substantially enriched in the BCE compound. This enriched solid phase can be subjected to washing or to other crystal purification techniques or it can be remelted and recrystallized from a solution with added paraffinic solvent in another crystallization stage. Thus, the crystallization and/or crystal purification technique can be repeated until the desired degree of product purity is obtained. Except for the specific crystallization solvents of the invention in combination with the crude BCE and related conditions herein, the crystallization process utilizes the general techniques and apparatus known in the art for similar processes.

The following example is presented to illustrate the invention but is not to be construed as unnecessarily limiting the same.

Example

A crude 1,2-bis(3-cyclohexen-1-yl)ethylene (BCE) which assayed at 86.7 area percent (by gas-liquid-chromatography) was diluted with an equal volume (50 ml.) of n-pentane and then chilled to $-80°$ F. in a large test tube which was immersed in a Dry Ice-acetone bath. The chilling was accomplished in about 15–20 minutes with constant agitation. The resulting slurry was then filtered at 5 inches of vacuum thru a fritted glass funnel which was vacuum jacketed, yielding about 14 cc. of frozen cake. After this single crystallization stage, cake which was recovered was remelted and found to assay (by GLC) 90.4 area percent BCE.

This example demonstrated that the crude BCE is substantially purified using but a single stage of crystallization from pentane. The test clearly showed the feasibility of even greater purification by using multiple stage crystallization from pentane.

In other similar tests, solvents such as methanol, ethanol, isopropanol, and acetone, were found unsatisfactory, generally because of the formation of multiple liquid phases at low temperatures. An attempt to crystallize BCE without the addition of a solvent failed. No separation of mother liquor could be made.

Certain modifications of the invention will become apparent to those skilled in the art and the illustrative details disclosed are not to be construed as imposing unnecessary limitations on the invention.

We claim:

1. A process for purifying crude 1,2-bis(3-cyclohexen-1-yl)ethylene (BCE) which comprises the steps of:
   (1) dissolving a sufficient amount of at least one aliphatic paraffin hydrocarbon of up to 8 carbon atoms per molecule therein to effect substantial crystal formation in step (2);
   (2) chilling the solution formed in step (1) so as to freeze a substantial portion of the compound 1,2-bis(cyclohexen-1-yl)ethylene therein; and
   (3) separately recovering the crystals from the liquor of step (2) containing a higher concentration of said compound than its concentration in the crude mixture.

2. The process of claim 1 wherein said paraffin hydrocarbon is n-pentane.

3. The process of claim 1 wherein the amount of said paraffin hydrocarbon dissolved in said crude 1,2-bis(3-cyclohexen-1-yl)ethylene is in the range of about 0.5 to 5 volumes per volume of said crude 1,2-bis(3-cyclohexen-1-yl)ethylene.

4. The process of claim 1 including the steps of:
  (4) melting the crystals recovered in step (3); and
  (5) repeating steps (1), (2), and (3) on the resulting melt to further enrich the BCE content of the crystals.

5. The process of claim 1 wherein said crude BCE is the reaction product obtained by contacting 4-vinylcyclohexene with a catalyst comprising at least one of the oxides of molybdenum or tungsten deposited on a support comprising at least one of silica and alumina under reaction conditions which produce said crude BCE.

References Cited
UNITED STATES PATENTS
3,342,884   9/1967   Solomon.

OTHER REFERENCES
H. A. Inhoffen et al., Chem. Ber. 88, pp. 1415–1423, 1955.

N. L. Allenzer et al., J. Amer. Chem. Soc. 86, pp. 2811–2819, 1964.

DELBERT E. GANTZ, *Primary Examiner.*

VERONICA O'KEEFE, *Assistant Examiner.*